(12) United States Patent
Slot

(10) Patent No.: US 6,705,469 B2
(45) Date of Patent: Mar. 16, 2004

(54) ONE-PIECE FOLDABLE PROTECTIVE SHIPPING CONTAINER/INSERT

(75) Inventor: John Slot, Blitterswijck (NL)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/999,627

(22) Filed: Oct. 31, 2001

(65) Prior Publication Data

US 2003/0080023 A1 May 1, 2003

(51) Int. Cl.[7] .................. B65D 85/30; B65D 85/00
(52) U.S. Cl. .................. 206/587; 206/592; 206/526
(58) Field of Search .................. 206/588, 586–594, 206/495, 523, 521, 526, 521.1, 521.3, 320, 722, 723, 433, 461, 467, 470, 471, 747, 748, 804, 443, 446, 745, 749, 563

(56) References Cited

U.S. PATENT DOCUMENTS

| | | | |
|---|---|---|---|
| D170,087 S | * 7/1953 | Harper | D9/341 |
| 3,580,479 A | * 5/1971 | Weiss | 206/521.1 |
| 5,131,212 A | 7/1992 | Grey et al. | 53/472 |
| 5,146,732 A | 9/1992 | Grey et al. | 53/472 |
| 5,307,117 A | 4/1994 | Harlan | 355/200 |
| 5,577,614 A | * 11/1996 | Palmeroni et al. | 206/588 |
| 6,142,304 A | * 11/2000 | Moren et al. | 206/587 |

* cited by examiner

Primary Examiner—Luan K. Bui
Assistant Examiner—John G Pickett
(74) Attorney, Agent, or Firm—Perman & Green, LLP

(57) ABSTRACT

Reusable one-piece, foldable, elongate, protective shipping container element formed to conformably-receive and support a product of predetermined size and shape. The container element includes a central, product-receiving section united to opposed end sections by means of transverse hinge areas adapted to be pivoted up and over the central section to form a top cover portion over a product received within the central section. The central section and end sections are formed with upwardly-extending spaced projections of predetermined contour, dimension and location, corresponding to the exterior size, shape and contour of a product to be contained, to receive and supportingly engage the product within the container when the end sections are pivoted up and over the central section to closed position into at least partial engagement with the product supported within the central section. The insert preferably is associated with an outer carton and is supportingly-received therewithin.

6 Claims, 4 Drawing Sheets

ONE-PIECE FOLDABLE PROTECTIVE SHIPPING CONTAINER/INSERT

BACKGROUND OF THE INVENTION

1. Field of the Invention

The present invention relates to a two-way, reusable protective shipping container, or insert for a shipping carton, which is designed for ease of proper use by a customer who receives a new or reconditioned element from the manufacturer and who must insert and return a similar but worn or damaged element to the manufacturer or supplier in the same container or insert.

More particularly, this invention relates to containers or inserts which are designed to receive and protectively hold delicate customer replaceable units (CRU), such as for an electrophotographic printing machine. Such units must be properly packaged by the customer in order to avoid such damage during shipping back to the manufacturer or supplier, which may make the unit unsatisfactory for repair or refurbishment.

Recently, electrophotographic printing machines have been developed which use one or more replaceable subassemblies called customer replaceable units (CRU). One typical CRU contains the machine photoreceptor and the necessary supporting hardware therefor, assembled in a single unit designed for insertion and removal into and out of the machine by the user. When the cartridge is no longer operational, the old cartridge is removed and a new one installed. Other replaceable cartridges including the developer cartridges, toner supply cartridges, etc., may also be envisioned for this purpose. In an effort to become environmentally more responsible, many of the CRU's are now recyclable in that they may be returned to the manufacturer, refurbished, and then resold to the customer.

Particularly, with respect to the cartridge containing the machine photoreceptor, it is important that the photoreceptor drum does not become damaged during transport. This is an absolute necessity for new CRU's but is also beneficial to the used CRU's being returned for recycling, as the less damage that is sustained by the photoreceptor drum, the easier and more economically it may be recycled into a new product. It is also desirous to provide a protective shipping cover which itself would be reusable and recyclable and thus not contribute to the growing waste problem.

2. State of the Art

Protective packaging has been proposed for the shipping of CRU elements back to the manufacturer or supplier, and reference is made to U.S. Pat. No. 5,307,117 as illustrative.

U.S. Pat. Nos. 5,131,212 and 5,146,732 disclose reusable paperboard shipping cartons containing protective plastic foam inserts for supporting and cushioning delicate elements during shipment to customers. The inserts must be properly oriented within the outer carton in order to receive and support the contents against movement in any direction under the effects of normal impacts which occur during shipping. Unless all of the protective foam inserts are properly inserted into the carton to support the underside, ends and top side of the delicate product being shipped, damage can occur. This procedure can be routine for the manufacturer or supplier, but can be more difficult for a customer who must return a used CRU.

SUMMARY OF THE INVENTION

The present invention relates to an inexpensive, simple-to-use, one-piece, foldable protective shipping container/insert designed, molded or formed with interior contours so to conform to the exterior shape and size of the product to be contained therein, such as a CRU, and also preferably with exterior contours to conform to the interior shape and size of a shipping carton, in cases where the contoured element is designed to be an insert.

Preferably, the present foldable shipping container is an insert formed from paper pulp composition as an elongate one-piece contoured shell having a spaced pair for transverse integral hinge areas which enable the end sections of the shell to be folded up and over the central shell section to partially or completely enclose the shell and to engage and hold a product engaged and held on the central shell section.

According to another, preferred, embodiment of the present invention the aforementioned elongate one-piece contoured shell is designed as an insert which is automatically-received within an outer shipping carton under the weight of the product, such as a CRU, inserted into the contoured interior surface of the center area of the shell. Engagement between the end panels of the carton and the hinged areas of the shell causes the end areas of the shell to pivot up and over the center area of the shell to enclose the shell and engage the upper surface of the product or CRU as the entire shell slides down into the carton.

BRIEF DESCRIPTION OF THE DRAWINGS

For the accompanying drawings.

DETAILED DESCRIPTION OF THE PREFERRED EMBODIMENT

Figure 1:
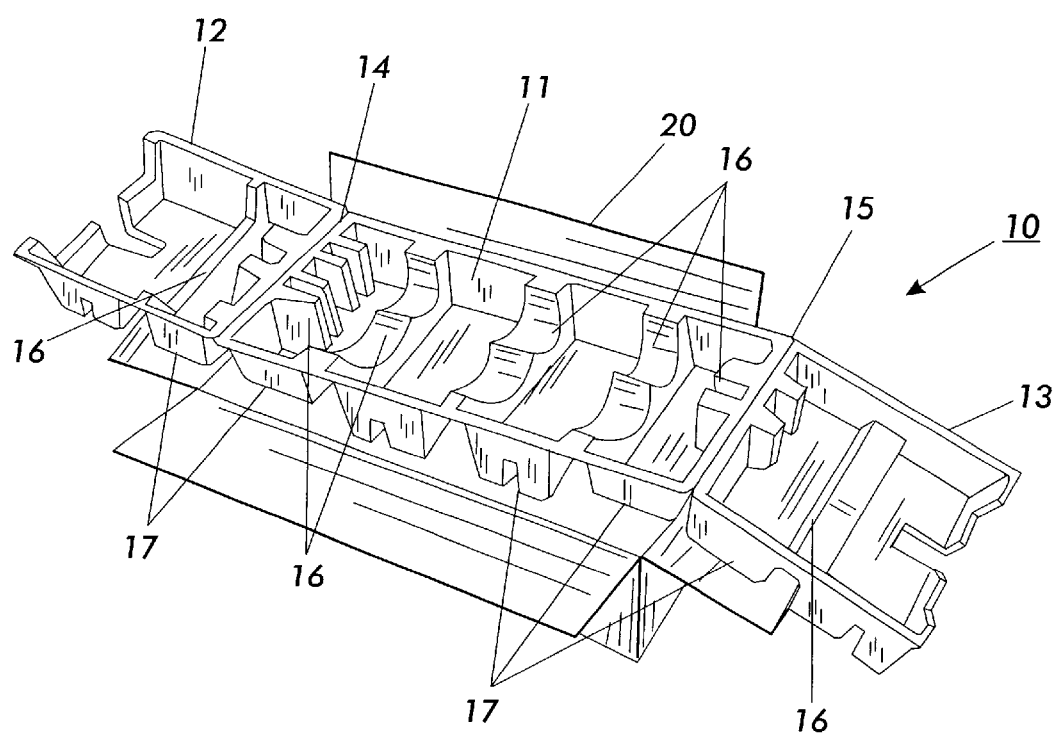
FIG. 1 is a perspective view of an assembly of an open elongate one-piece contoured shell shipping container insert in association with a mating shipping carton, ready for the insertion of a product or CRU to be packaged.
Figure 2:
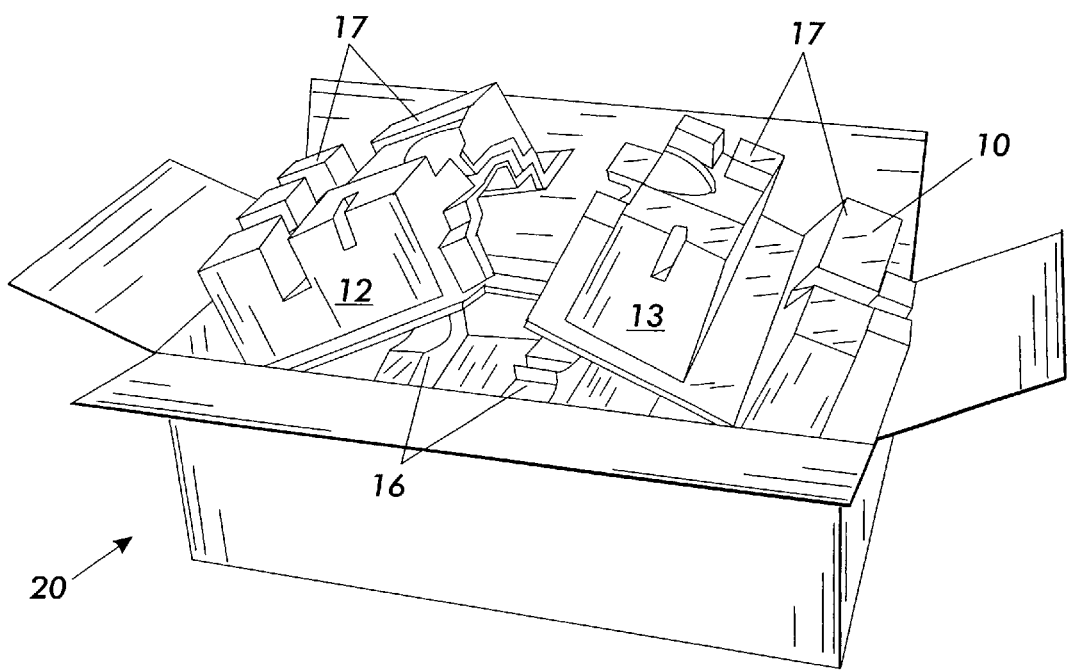
FIG. 2 is a perspective view of the assembly of FIG. 1, illustrating the end areas of the shell insert being pivoted up and over the central area of the shell as the central area of the shell moves down inside the shipping carton.
Figure 3:
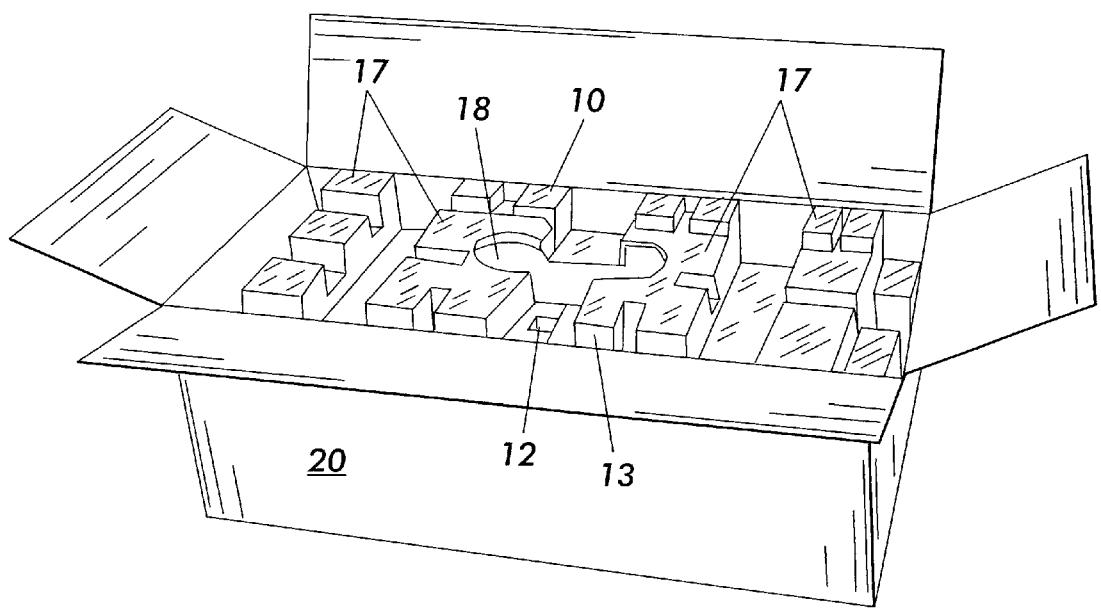
FIG. 3 is a perspective view of the assembly of FIG. 2, illustrating the closed shell insert fully contained within the shipping carton, positioned to be enclosed by folding the end flaps and the side flaps of the carton.

FIGS. 1 to 3 of the drawings illustrate the preferred embodiment of the novel one-piece, foldable, elongate, protective shipping container inserts or shells 10 of the present invention assembled with an outer shipping carton 20, such as of corrugated paperboard, having an interior length and width slightly greater than the length and width of the folded insert or shell 10.

The insert or shell 10 preferably is pressed, molded or formed from a sheet or web of paper pulp, in the same manner as conventional egg containers, but as an elongate shell 10 having a central shell section 11 and opposed end sections 12 and 13 united with the central section 11 by mean of transverse integral hinge areas 14 and 15 formed at the upper surface of the open or unfolded shell 10. Shell sections 11, 12 and 13 are of similar depth, slightly less than half the depth of the carton 20. The length of the central shell section 11 is slightly less than the length of the interior of the carton 20, and the length of each end section 12 and 13 of the shell 10 is slightly less than half the length of the shell 10 so that the end sections 12 and 13 pivot up and over the central shell section 11 to cover it and to engage and secure the product or CRU (not shown) contained therewithin, as illustrated by FIGS. 2 and 3.

The elongate shell 10 is formed to have spaced upwardly-extended projections 16 which are of predetermined contour, dimension and location depending on the exterior size, shape and features of the product or CRU for which the shell 10 is made. The elongate shell 10 is also formed to have spaced downwardly-extending projections 17 having coplanar carton-engaging support areas. In the illustrated embodiment, the shell sections 12 and 13 are formed to provide a central upper opening 18 in folded position, shown most clearly in FIG. 3, to accommodate the handle of a xerographic CRU module shown in FIG. 2 of U.S. Pat. No. 5,307,117, for ease of loading and unloading the CRU during packaging and unpackaging.

Figure 4:
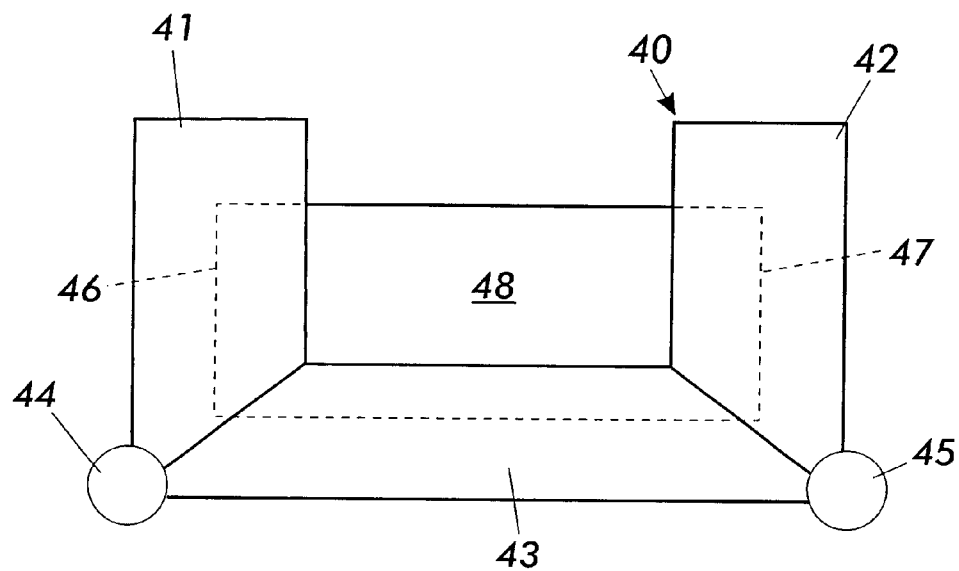
FIG. 4 is a side view of a shell insert according to an embodiment of the invention in which the integral hinge areas are located at the base or floor area of the shell, adjacent to the end areas.
Figure 5:
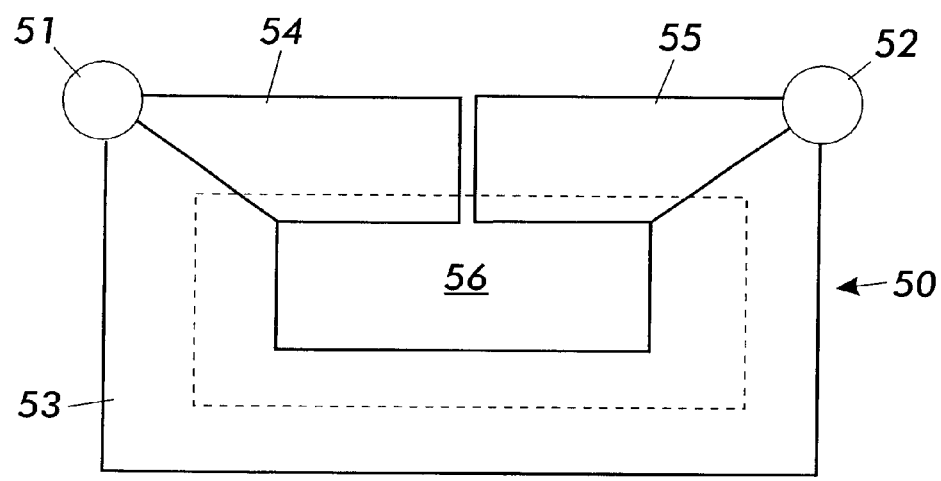
FIG. 5 is a side view of a shell insert according to another embodiment of the invention in which the hinge areas are located at the top or upper edges of the end areas of the shell insert.

FIGS. 4 and 5 illustrate other elongate shell embodiments which may be more preferable than shell 10 of FIGS. 1 to 3 for products or CRU elements or modules of different shapes and sizes. The shell 40 of FIG. 4, shown in folded position, has opposed end caps or sections 41 and 42 united with the central shell section 43 by means of transverse integral hinge areas 44 and 45 formed at the base or floor area of the shell 40. The end sections 41 and 42 are formed with recessed areas 46 and 47, shown by means of broken lines, so as to form end caps which engage and hold and partially cover the packaged product 48 when the end sections 41 and 42 are pivoted up and over the ends of the product 48, preferably in assembly with an outer carton 20 as shown in FIGS. 1 to 3.

The elongate shell 50 of FIG. 5 is similar to shell 10 of FIGS. 1 to 4 except that the transverse integral hinge areas 51 and 52 are formed at the top end surfaces of the central shell section 53 and the opposed end sections 54 and 55. After a product 56 is inserted into the central shell section 53, the end sections 54 and 55 are pivoted over the product to engage and secure it in place, preferably within an outer carton 20 as shown in FIGS. 1 to 3.

The preferred composition of the present one-piece foldable protective elongate shipping containers or shells is paper pulp composition formed to have a strong, cushioning thickness of between about 1/16 and 1/4 inch and integral hinge areas, since such containers can be molded or formed in a continuous in-line process ready to use. However similar elongate containers or shells can be molded or formed in similar manner from other cushioning materials such as plastic foam composition, similarly to plastic foam egg containers and food containers. While such containers may be suitable, per se, for the packaging and shipping of some products, most preferably they are designed for use as inserts or cushioning shells for relatively heavy CRU products such as electrophotographic photoreceptor modules with supporting hardware, and are supported within an outer corrugated paperboard carton, as illustrated by the present drawings.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An assembly of an elongate, longitudinal shipping container element and an elongate outer shipping carton having a length, width and height slightly larger than said shipping container element in closed position so as to receive and enclose said element as an insert therewithin, said shipping container element comprising a central, product-receiving section united to opposed end sections by means of transverse hinge areas adapted to be pivoted up and over said central section to form a top cover portion over a product received within said central section, said central section and end sections being formed with upwardly-extending spaced projections of predetermined contour, dimension and location, corresponding to the exterior size, shape and contour of the product to be contained, to receive and supportingly engage a said product within said shipping container element when said end sections are pivoted up and over said central section to closed position into at least partial engagement with a said product supported within said central section, said carton having opposed end panels providing a length therebetween which is slightly larger than the length of the central section of said shipping container element to permit the elongate shipping container element to be supported on said carton, with each upper hinge area of said element overlying an opposed end panel of said carton, across the width of said carton, whereby a said product can be placed upon the central section of said shipping container and said shipping container will pivot to closed position and move down within said carton under the weight of said product, permitting the carton to be closed for shipping.

2. An assembly according to claim 1 in which said container element is formed from paper pulp composition in which said transverse upper hinge areas are integral.

3. An assembly according to claim 1 in which the opposed end sections of the container element form a top cover portion which covers said central section and a product received therewithin.

4. An assembly according to claim 3 in which said opposed sections are substantially equal in length and have openings at the leading ends of each which form a central access port in the top cover portion for the handle of a product received therewithin.

5. An assembly according to claim 1 in which the opposed end sections of the container element form a top cover portion which comprises end cap portions which overlie and enclose the ends of said central section adjacent the hinge areas thereof and engage a product received therewithin.

6. An assembly according to claim 1 designed to conformably-receive and support a customer-replaceable unit for shipment to a customer by a supplier and for reuse by the customer for return of a worn customer-replaceable unit to the supplier.

* * * * *